US009343196B2

(12) United States Patent
Matsukura et al.

(10) Patent No.: US 9,343,196 B2
(45) Date of Patent: May 17, 2016

(54) RESIN COMPOSITION WITH HIGH DIELECTRIC INSULATION PROPERTIES

(71) Applicant: Momentive Performance Materials Japan LLC, Minato-ku, Tokyo (JP)

(72) Inventors: Toshihiko Matsukura, Joso (JP); Hiroyoshi Iijima, Minato-ku (JP); Masanari Shimakawa, Minato-ku (JP)

(73) Assignee: MOMENTIVE PERFORMANCE MATERIALS JAPAN LLC, Minato-ku, Tokyo (JP)

( * ) Notice: Subject to any disclaimer, the term of this patent is extended or adjusted under 35 U.S.C. 154(b) by 0 days.

(21) Appl. No.: 14/357,411

(22) PCT Filed: Jan. 24, 2013

(86) PCT No.: PCT/JP2013/051399
§ 371 (c)(1),
(2) Date: May 9, 2014

(87) PCT Pub. No.: WO2013/115045
PCT Pub. Date: Aug. 8, 2013

(65) Prior Publication Data
US 2014/0296387 A1    Oct. 2, 2014

(30) Foreign Application Priority Data

Jan. 30, 2012 (JP) .................................. 2012-016089
Jan. 23, 2013 (JP) .................................. 2013-009810

(51) Int. Cl.
| | |
|---|---|
| C08K 3/22 | (2006.01) |
| H01B 3/10 | (2006.01) |
| H01B 3/12 | (2006.01) |
| H01B 3/46 | (2006.01) |
| H01G 4/18 | (2006.01) |
| H01B 3/28 | (2006.01) |
| H01G 4/12 | (2006.01) |
| H01G 4/20 | (2006.01) |
| H01B 3/00 | (2006.01) |
| H01B 3/40 | (2006.01) |
| C08L 83/08 | (2006.01) |
| C08G 77/24 | (2006.01) |

(52) U.S. Cl.
CPC . *H01B 3/10* (2013.01); *C08L 83/08* (2013.01); *H01B 3/002* (2013.01); *H01B 3/12* (2013.01); *H01B 3/28* (2013.01); *H01B 3/40* (2013.01); *H01B 3/46* (2013.01); *H01G 4/1227* (2013.01); *H01G 4/1245* (2013.01); *H01G 4/18* (2013.01); *H01G 4/206* (2013.01); *C08G 77/24* (2013.01); *C08K 2003/2206* (2013.01); *C08K 2003/2237* (2013.01); *C08K 2003/2244* (2013.01)

(58) Field of Classification Search
CPC ............... C08K 2003/2206; C08K 2003/2244; C08K 2003/2237
See application file for complete search history.

(56) References Cited

U.S. PATENT DOCUMENTS

| | | | | |
|---|---|---|---|---|
| 5,155,072 | A * | 10/1992 | Bruno et al. ................... | 501/138 |
| 5,275,878 | A   | 1/1994  | Yamakawa et al. | |
| 2003/0057405 | A1* | 3/2003 | Matoba et al. ................ | 252/500 |
| 2005/0137293 | A1  | 6/2005 | Liu et al. | |
| 2007/0049485 | A1  | 3/2007 | Tanabe et al. | |
| 2007/0097597 | A1  | 5/2007 | Ko et al. | |
| 2008/0226927 | A1* | 9/2008 | Kaneda et al. ................ | 428/432 |
| 2008/0232032 | A1* | 9/2008 | Jones et al. ................... | 361/509 |

FOREIGN PATENT DOCUMENTS

| | | |
|---|---|---|
| CN | 1959859 A | 5/2007 |
| EP | 2 234 118 A1 | 9/2010 |
| EP | 2 495 285 A1 | 9/2012 |
| JP | 05-094717 A | 4/1993 |
| JP | 07-182921 A | 7/1995 |
| JP | 08-022716 A | 1/1996 |
| JP | 09-031244 A | 2/1997 |
| JP | 2001-230148 A | 8/2001 |
| JP | 2003-138067 A | 5/2003 |
| JP | 2003-331653 A | 11/2003 |
| JP | 2004-335364 A | 11/2004 |
| JP | 2005-225721 A | 8/2005 |
| JP | 2006-001989 A | 1/2006 |
| JP | 2006-290939 A | 10/2006 |
| JP | 2007-126661 A | 5/2007 |
| JP | 2008-195604 A | 8/2008 |
| JP | 2011-116955 A | 6/2011 |
| WO | WO 2011/052614 A1 | 5/2011 |

OTHER PUBLICATIONS

JP 05-094717 abstract, Apr. 1993.*
International Search Report from PCT/JP2013/051399 (2 pages).
Supplementary European Search Report for PCT/JP2013/051399 dated Apr. 24, 2015 (5 pgs.).
English translation of International Preliminary Report on Patentability and Written Opinion of the International Searching Authority for PCT/JP2013/051399 (10 pages).

* cited by examiner

*Primary Examiner* — Margaret Moore
(74) *Attorney, Agent, or Firm* — Flynn, Thiel, Boutell & Tanis, P.C.

(57) ABSTRACT

Provided is a resin composition with high dielectric insulation properties that has a dielectric constant of at least 20, a dielectric tangent of 0.1 or less, outstanding insulation properties (at least $10^{12}$ Ω·cm), and for use in electrical power, communication devices, and the like. A resin composition with high dielectric insulation properties comprises a constituent (A), which is 100 parts by mass of a polymer material that acts as a dispersion medium for constituent (B), and a constituent (B), which is 100-3000 parts by mass of a perovskite complex oxide powder comprising secondary particles formed by the mutual bonding of primary particles through sintering and represented by the formula: $ABO_3$.

15 Claims, No Drawings

RESIN COMPOSITION WITH HIGH DIELECTRIC INSULATION PROPERTIES

TECHNICAL FIELD

The present invention relates to a high dielectric insulating resin composition used for devices of electric power, telecommunication, and the like.

BACKGROUND ART

Conventionally, materials showing a high dielectric property have been used for electric power applications and telecommunication device applications.

In electric power applications, it is known that the materials are used as electric field-relaxing members of connection portions and terminal portions of electric cables.

In telecommunication device applications, there is a problem of electric noise as a cause of data errors of integrated circuits. In order to suppress the influence of electric noise, there is known a method in which the electric noise may be removed by providing a capacitor having a large electric capacity on a printed circuit, and downsizing and high functionality of electronic parts can be realized by using the high dielectric material as a material of capacitors.

As base materials used for these applications, organic rubbers represented by EPDM and thermosetting resins represented by an epoxy resin are known. Furthermore, recently, high dielectric rubber materials having an excellent weather resistance are being developed by blending a high dielectric substance into a silicone rubber having an excellent weather resistance.

As the high dielectric substance to be blended into the base materials, dielectric ceramics such as a metal oxide or barium titanate, and carbon black are known.

The prior art patents in which the high dielectric substance is blended into the base materials are as follows.

In the invention of JP-A 2003-331653, there is described a silicone rubber composition for electric power connecting portions obtained by blending a composite oxide such as a solid solution of zinc oxide, aluminum oxide as the high dielectric substance, into a silicone rubber as the base material.

In the invention of JP-A 2006-1989, there is described a high dielectric elastomer composition in which a high dielectric ceramic powder is blended into various elastomers.

In the invention of JP-A 5-94717, there is described a composite dielectric material in which porous inorganic dielectric particles including secondary particles obtained by gathering primary particles are dispersed in a resin, and it is also described that the secondary particle is a particle obtained by the primary particles bonded to each other by sintering.

In the invention of JP-A 9-31244, there is described a high dielectric elastomer composition containing composite fibers such as a fibrous material of metal salt of titanic acid. There is also described that in the composite fiber, a molar ratio (Ti/M) between a metal M (Ba, Sr, Ca, etc.) and Ti is in the range of 1.005 to 1.5.

In the invention of JP-A 2003-138067, there is described a high dielectric rubber composition into which barium titanate is blended.

The prior art patents in which a carbon-based material is blended into the base materials are as follows.

In the invention of JP-A 8-22716, there is described a high dielectric insulating rubber material in which a furnace-based carbon black is blended into an ethylene-propylene rubber or an ethylene-propylene-diene rubber.

In the invention of JP-A 2006-290939, there is described a high dielectric elastomer composition in which a dielectric ceramic and a carbon black are blended into styrene-based and olefin-based elastomers.

SUMMARY OF THE INVENTION

According to the invention of JP-A 2003-331653, there is a problem in which, in trying to obtain an effective relative dielectric constant (relative dielectric constant >20), the electric insulating property is lowered by exhibiting a semi-conductive property. In addition, as to electric properties in the application in which a high dielectric property is required, there is not shown any data concerning a dielectric tangent.

In the invention of JP-A 2006-1989, there is described that 300 to 1200 parts by mass of a high dielectric ceramic powder as the high dielectric substance is blended into 100 parts by mass of an elastomer (Paragraph 0020), and also in the Examples, there is blended the high dielectric ceramic powder in amounts of 400, 800, 1000 parts by mass. Blending of such a large amount makes it possible to achieve an enhancement of the dielectric property, but has a disadvantage of impairing the properties of the elastomer itself. Furthermore, as to the electric properties in the application in which a high dielectric property is required, there is not shown any data concerning volume resistivity.

The invention of JP-A 5-94717 relates to high dielectric ceramics, and although a particle size and specific surface area are referred to, an A/B molar ratio of the $ABO_3$ structure that is an important feature of the perovskite structure is not referred to and its effect is not made clear. In addition, as to electric properties in the application in which a high dielectric property is required, there is not shown any data concerning volume resistivity.

The invention of JP-A 9-31244 does not satisfy the electric properties useful to the application in which a high dielectric property is required.

In the invention of JP-A 2003-138067, since, in the Example, 300 to 750 parts by mass are blended relative to 100 parts by mass of an ethylene-propylene rubber which forms the base polymer, there is the same problem as that in the invention of JP-A 2006-1989 from the viewpoints of rubber properties and electric properties.

According to the invention of JP-A 8-22716, there is a problem in which, in trying to obtain a relative effective dielectric constant (relative dielectric constant >20), there appears semi-conductive region.

In the invention of JP-A 2006-290939, since the relative dielectric constant does not reach an effective region, the property that can be satisfied is not obtained.

A problem of the present invention is to provide a high dielectric insulating resin composition which exhibits a relative dielectric constant of 20 or more, a dielectric tangent of 0.1 or less, which is excellent in electric insulation ($10^{12}$ $\Omega \cdot cm$ or more), and which is used for electric power, telecommunication devices, and the like.

The present invention provides a high dielectric insulating resin composition containing a component (A): 100 parts by mass of a polymeric material which is a dispersing medium of a component (B), and the component (B): 100 to 3000 parts by mass of a perovskite-type composite oxide powder which includes secondary particles obtained by primary particles bonded to each other by sintering, and which is represented by the formula: $ABO_3$.

The present invention provides a member for electric power or telecommunication, including a molded article obtained from the aforementioned high dielectric insulating resin composition using a mixture containing a polyorganosiloxane and a curing agent or an epoxy resin as the component (A).

The present invention provides the application of the aforementioned high dielectric insulating resin composition, to a member for electric power or telecommunication.

The high dielectric insulating resin composition of the present invention can be used as a composition for producing a member for telecommunication in addition to a member for electric power such as a rubber member for a connecting portion of an electric power cable.

The molded article obtained from the high dielectric insulating resin composition exhibits a relative dielectric constant of 20 or more, a dielectric tangent of 0.1 or less, is excellent in electric insulation, for example $10^{12}$ Ω·cm or more, and is also excellent in mechanical strength, and thus the material is suitable as electric power applications (a connecting portion of an electric power cable, etc.) and telecommunication device applications.

DETAILED DESCRIPTION OF THE INVENTION

Component (A)

The polymeric material of the component (A) is a dispersing medium for dispersing and keeping the perovskite-type composite oxide powder of the component (B), and is selected depending on the use of the high dielectric insulating resin composition.

As the polymeric material of the component (A), there can be used one selected from a synthetic resin, a natural rubber, a synthetic rubber and a synthetic elastomer can be used.

As the synthetic resin, there can be used a thermoplastic resin such as polyphenylene ether, polyphenylene sulfide, polyethersufone, polyether imide, liquid crystal polymer, polystyrene, polyethylene, or fluororesin, and a thermosetting resin such as an epoxy resin, phenol resin, polyimide, acrylic resin, cyanate resin or benzocyclobutene resin. Among them, the epoxy resin is preferable.

Meanwhile, as necessary, a known filler can be blended into these synthetic resins. Furthermore, when using the thermosetting resin, a curing agent, a curing accelerator, and the like can be blended, as necessary.

As a curing agent for the epoxy resin, a curing agent used as an ordinary curing agent for the epoxy resin can be added. Examples of such curing agents include an amine-based curing agent, an acid anhydride-based curing agent, a phenol-based curing agent, and the like.

Specific examples are aliphatic amines and aliphatic polyamines such as diethylenetriamine or triethylenetetramine, aliphatic polyamines containing aromatic ring, alicyclic- and cyclic-polyamines, aromatic amines such as diaminediphenylsulfone, aliphatic acid anhydrides, alicyclic acid anhydrides, aromatic acid anhydrides, halogen-based acid anhydrides, etc., trisphenol, phenol novolac, cresol novolac, bisphenol A novolac, bisphenol F novolac, phenols-dicyclopentadiene polyadditional-type resin, dihydroxynaphthalene novolac, polyphenols having xylidene as a linkage group, phenol-aralkyl resin, naphthols, polyamide resin, and modified compounds thereof, initial condensation products having a methylol group obtained by reacting formalin with phenol, urea, melamine, etc., basic active hydrogen compounds represented by dicyandiamide, triamines such as tris(dimethylaminomethyl)phenol, imidazole, Lewis acid and Bronsted acid salts such as $BF_3$-amine complex, polymercaptan-based curing agent, isocyanate or blocked isocyanate, organic acid dihydrazide, and the like. In addition, these curing agents can be used in combination.

Examples of the synthetic rubbers and synthetic elastomers include, other than silicone rubber, ethylene.propylene rubber, polyolefin-based elastomers such as isobutylene rubber, ethylene propylene diene rubber, ethylene propylene terpolymer or chlorosulfonated polyethylene rubber, styrene-based elastomers such as styrene-isoprene-styrene block copolymer (SIS), styrene-butadiene-styrene copolymer (SBS) or styrene-ethylene-butylene-styrene block copolymer (SEBS), isoprene rubber, urethane rubber, epichlorohydrin rubber, Nylon 12, butyl rubber, butadiene rubber, polynorbornene rubber, acrylonitrile-butadiene rubber, and the like. Particularly, in the applications in which there are required weather resistance, heat resistance and the like for members for electric power (e.g. a member for electric power cable), a member for telecommunication and the like, a silicone rubber is preferable.

When using the silicone rubber as the polymeric material of the component (A), a mixture containing a polyorganosiloxane, a curing agent, and as necessary, a component such as a filler is preferable.

The polyorganosiloxane is one which can be represented by the average unit formula (I):

$$R_a SiO_{(4-a)/2} \qquad (I)$$

(wherein R is a substituted or unsubstituted monovalent hydrocarbon group, and a is a numeral in the range of 1.98 to 2.02).

Examples of the substituted or unsubstituted monovalent hydrocarbon groups bonding to a silicon atom represented by R include an alkyl group such as methyl, ethyl or propyl, an alkenyl group such as vinyl, allyl or butadienyl, an aryl group such as phenyl, xenyl or naphthyl, a cycloalkyl group such as cyclohexyl, a cycloalkenyl group such as cyclohexenyl, an aralkyl group such as benzyl, an alkylaryl group such as tryl or xylyl, chloromethyl, 3,3,3-trifluoropropyl, and the like.

As the monovalent hydrocarbon group bonding to the silicon atom, methyl is mainly employed, and as to the vinyl group, from the viewpoint of mechanical strength and crosslinking property, vinyl may be contained in an amount of 0 to about 5%, particularly in the range of 0.05 to 3% relative to the whole of the monovalent hydrocarbon group.

The molecular chain terminal groups of the polyorganosiloxane can include hydroxyl group, an alkoxy group or a triorganosilyl group, and the triorganosilyl group is preferable. Examples of the triorganosilyl groups include trimethylsilyl, dimethylvinylsilyl, methylphenylvinylsilyl, methyldiphenylsilyl, and the like.

As the polyoroganosiloxane, a fluoroalkyl group-containing polyorganosiloxane can be used, and in this case, a preferred compound is one which contains a 3,3,3-triflurolopropyl group in an amount of 5 to 50% by mole relative to the whole of the monovalent hydrocarbon group from the viewpoint of dielectric properties and workability, and contains a vinyl group in an amount of 0.01 to 2% by mole in order to achieve crosslinking effectively.

An average degree of polymerization of the polyorganosiloxane is preferably within the range of approximately 200 to 20000.

The polyorganosiloxane is preferably a perfluoroalkyl group-containing organosiloxane represented by the average composition formula (I):

$$R_a SiO_{(4-a)/2} \qquad (I)$$

(wherein a 5 to 50% by mole of R is a group represented by the formula —$CH_2CH_2Rf$ in which Rf represents a perfluoroalkyl group having 1 to 3 carbon atoms, and the residual 95 to 50% by mole represents a saturated or unsaturated monovalent hydrocarbon group, and a is a numeral of 1.8 to 2.3), and has a viscosity of 1 Pa·s or more at 23° C.

The curing agent is not particularly limited as long as the component (A) can be cured. As to a curing agent of the silicone rubber, a known organic peroxide catalyst and a combination of platinum-based catalyst and organohydrogenpolysiloxane are preferable.

Examples of the organic peroxide catalysts include benzoyl peroxide, 2,4-dichlorobenzoyl peroxide, o-methylbenzoyl peroxide, p-methylbenzoyl peroxide, 2,4-dicumyl peroxide, 2,5-dimethyl-bis(2,5-t-butylperoxy)hexane, di-t-butyl peroxide, t-butyl perbenzoate, and the like.

Generally, an amount of the organic peroxide catalyst is preferably 0.1 to 5 parts by mass relative to 100 parts by mass of the component (A).

When using the combination of platinum-based catalyst and organohydrogenpolysiloxane as the curing agent, it is necessary that the polyorganosiloxane has at least two aliphatic unsaturated bonds, particularly alkenyl groups such as vinyl group or allyl group, which are bonded to silicon atom in one molecule.

As the platinum-based catalyst, there can be used a known one, and specific examples thereof include platinum, a platinum compound, a platinum composite, chloroplatinic acid, an alcoholic compound of platinic acid, an aldehyde compound, an ether compound, a complex with various olefins, and the like.

The amount of the platinum-based catalyst is an effective amount, and specifically, it is desirable that platinum atom is generally in the range of 1 to 2,000 ppm relative to the organopolysiloxane of the component (A).

The organohydrogenpolysiloxane may be any of linear, branched, and cyclic polysiloxanes, but preferably has an average degree of polymerization of 300 or less.

Examples of the organohydrogenpolysiloxanes can include a diorganopolysiloxane terminated at its ends by a dimethyl hydrogen silyl group, a copolymer of dimethylsiloxane unit, methylhydrogensiloxane unit and trimethylsiloxane terminal end unit, a copolymer that is a low viscous fluid including a dimethylhydrogensiloxane unit $(H(CH_3)_2SiO_{0.5}$ vc unit) and $SiO_2$ unit, 1,3,5,7-tetrahydrogen-1,3,5,7-tetramethylcyclotetrasiloxane, 1-propyl-3,5,7-trihydrogen-1,3,5,7-tetramethylcyclotetrasiloxane, 1,5-dihydrogen-3,7-dihexyl-1,3,5,7-tetramethylcyclotetrasiloxane, and the like.

The addition amount of the organohydrogenpolysiloxane is also an effective amount, and specifically, the organohydrogenpolysiloxane is desirably used so that a proportion of hydrogen atom bonded directly to a silicon atom is 50 to 500% by mole relative to the alkenyl group of the polyorganosiloxane.

Component (B)

The component (B) used in the present invention is the perovskite-type composite oxide powder which includes secondary particles obtained by primary particles bonded to each other by sintering, and which is represented by the formula: $ABO_3$.

In the formula, A is selected from Ba, Ca and Sr, and B is selected from Ti and Zr.

In the formula, A preferably contains Ba, and may contain Ba alone, a combination of Ba and Ca, a combination of Ba and Sr, or a combination of Ba, Ca and Sr.

A composition ratio of Ba in A is preferably 90% by mole or more.

In the formula, B preferably contains Ti, and may contain Ti alone, or Ti and Zr.

A composition ratio of Ti in B is preferably 80% by mole or more.

A molar ratio of A/B is preferably 0.996 to 1.005, and is more preferably 0.997 to 1.003 in order to enhance the dielectric constant.

When A contains Ba and B contains Ti, a molar ratio of Ba/Ti is preferably 1.010 to 1.400. Within the aforementioned range, a relative dielectric constant can be enhanced.

Meanwhile, one described in JP-A 9-31244 has a molar ratio (Ti/M) between a metal M (Ba, Sr, Ca etc.) and Ti within the range of 1.005 to 1.5, and in case of M(Ba)/Ti, the molar ratio is about 0.99502 to 0.66666, and thus one described in JP-A 9-31244 is different from the present invention.

Preferable perovskite-type composite oxide powder of the component (B) include $BaTiO_3$, $CaTiO_3$, $SrTiO_3$, $MgTiO_3$, $Ba_xCa_{1-x}TiO_3$ (wherein x being 0<x<1), $Ba_xSr_{1-x}ZrO_3$ (wherein x being 0<x<1), $BaTi_xZr_{1-x}O_3$ (wherein x being 0<x<1), $Ba_xCa_{1-x}Ti_yZr_{1-y}O_3$ (wherein x, y being 0<x<1, 0<y<1), and the like, and $Ba_xCa_{1-x}Ti_yZr_{1-y}O_3$ (wherein x, y being 0<x<1, 0<y<1) is preferable.

These perovskite-type composite oxides may be used alone or in combinations of two or more of them.

The perovskite-type composite oxide powder of the component (B) is secondary particles obtained by primary particles bonded to each other by sintering.

When being in a state of a primary particle, since a ratio of fine particles becomes large and a particle size distribution becomes non-uniform, a dielectric tangent of the composition is degraded.

Therefore, the perovskite-type composite oxide powder of the component (B) is preferably set to have an average particle size of 5 to 50 µm, by sintering the primary particle size of approximately 0.1 to 2 µm, and more preferably set to have an average particle size of 10 to 35 µm. When the average particle size is within the aforementioned range, the size is preferable from the viewpoint of enhancement of handling and dispersion properties. The perovskite-type composite oxide powder having an average particle size of 5 to 50 µm preferably contains one having a particle size of 5 to 50 µm in an amount of 50% by mass or more, and the powder having an average particle size of 10 to 35 µm preferably contains one having a particle size of 10 to 35 µm in an amount of 50% by mass or more.

In addition, the perovskite-type composite oxide powder of the component (B) can also be a mixture obtained by mixing one having an average particle size of 5 to 50 µm and one having an average particle size of 0.1 µm to less than 5 µm.

At this time, with respect to a content ratio of one having an average particle size of 5 to 50 µm, the upper limit is preferably 50% by mass or more, more preferably 60% by mass or more, and the lower limit is preferably 90% by mass. The content ratio of one having an average particle size of 0.1 µm to less than 5 µm is residual, i.e. 10% by mass to 50% by mass. The mixture may have an average particle size of less than 5 µm, preferably has an average particle size of 1 to 40 µm, and more preferably has an average particle size of 1 to 30 µm.

In the case where the component (B) is the aforementioned mixture, a state is reached in which the small particles (one having an average particle size of from 0.1 µm to less than 5 µm) enter in the gap formed by the large particles (one having an average particle size of 5 to 50 µm), and a high effect is obtained even with the use of the mixture having an average particle size of less than 5 µm.

The particle size and the average particle size can be measured by laser light scattering method.

In addition, one having a low impurity content is particularly preferable in obtaining a product with a high purity.

A BET specific surface area of the perovskite-type composite oxide powder of the component (B) is 0.05 to 5.00 $m^2/g$, preferably 0.10 to 3.00 $m^2/g$ from the viewpoint of handling property, dispersion property, and adhesion to resin.

The perovskite-type composite oxide powder of the component (B) can be obtained by producing the primary particles through a wet method such as co-precipitation method, hydrolysis method or hydrothermal method, sol-gel method, and solid state method, etc., and then by sintering for producing the secondary particles.

In case of blending with the resin, a blending amount of the component (B) is, relative to 100 parts by mass of the resin, 100 to 3000 parts by mass, preferably 200 to 2000 parts by mass.

When being used as an elastomer material, in order to achieve both a rubber property and a high dielectric property, 100 to 500 parts by mass, preferably 150 to 950 parts by mass is blended relative to 100 parts by mass of the elastomer material of the component (A).

Component (C)

The carbon black of the component (C) used in the present invention is a component for further increasing a relative dielectric constant by acting synergistically on the component (B).

The carbon black of the component (C) may be selected from thermal-based, furnace-based, or acetylene-based carbon black.

Examples of the thermal-based carbon blacks include ASAHI#50 (Trade name, manufactured by ASAHI CARBON CO., LTD.), and the like, examples of the furnace-based carbon blacks include Tokai Carbon Seast S (Trade name, manufactured by TOKAI CARBON CO., LTD.), examples of the acetylene blacks include Denka Black (Trade name, manufactured by DENKI KAGAKU KOGYO KABUSHIKI KAISHA), SHAWNIGAN Acetylene Black (Trade name, manufactured by SHAWNIGAN Chemical, Co., Ltd.), and the like. Examples of conductive furnace blacks include Continex CF, Continex SCF (Trade name, manufactured by Continental Carbon, Co., Ltd.), Vulcan C, Vulcan SC, Vulcan P, Vulcan XC-72 (Trade name, manufactured by Cabot Corporation, Ltd.), ASAHI HS-500 (Trade name, manufactured by ASAHI CARBON CO., LTD.), and the like.

Examples of the conductive channel blacks include Corax L (Trade name, manufactured by DEGUSSA AG), and the like.

Furthermore, Ketjen Black EC, Ketjen Black EC-600JD (Trade name, manufactured by Ketjen Black International Com) which are kinds of furnace black can also be used. In addition, there can also be used fullerene, mono-layer carbon nano tube, multi-layer carbon nano tube, and the like.

Moreover, carbon blacks surface-modified can also be utilized. Particularly, since carbon blacks surface-modified with silica are preferable because electric properties can be controlled by an amount of coating, and examples thereof include CRX grades of CABOT Corporation, Ltd., and the like.

A blending amount of the component (C) is 0.1 to 40 parts by mass relative to 100 parts by mass of the component (A), preferably 5 to 35 parts by mass. When the blending amount is 5 parts by mass or more, a relative dielectric constant can be increased due to the synergistic effects of the component (B) and the component (C). In the case of 40 parts by mass or less, it is preferable since the dielectric tangent becomes smaller, and the electric insulation becomes higher.

Other Components

In the composition or the polymeric material of the component (A) of the present invention, in addition to the aforementioned essential components, there can be added, as other components, various additives such as a filler like a reinforcing silica fine powder, a colorant or a heat-resistance improver, a reaction-controlling agent, a mold release agent, a dispersant for fillers and the like, within a range not preventing the effects of the present invention.

Examples of the dispersing agents for fillers can include a diphenylsilanediol, various alkoxysilanes, a carbon functional silane, a low-molecular siloxane containing a silanol group, or the like, and when used, it is preferable that the minimum addition amount not impairing the effects of the present invention is maintained.

Meanwhile, in the composition or the polymeric material of the component (A) of the present invention, as necessary, various additives such as a reinforcing filler, a heat-resistance improver, or a flame retardant may be blended.

Examples of the reinforcing fillers include an aerosol silica, a precipitated silica, a kieselguhr, and the like. Examples of the heat-resistance improvers include graphite, aluminum oxide, titanium dioxide, cerium hydroxide, mica, clay, glass beads, polydimethylsiloxane, alkenyl group-containing polysiloxane, and the like.

The molded article obtained from the composition according to the present invention preferably has a relative dielectric constant that is measured by the method described in the Example of 20 or more, more preferably of 25 or more, and further preferably of 30 or more.

The molded article obtained from the composition according to the present invention preferably has a dielectric tangent that is measured by the method described in the Example of 0.1 or less, more preferably of 0.08 or less, and further preferably of 0.06 or less.

The molded article obtained from the composition according to the present invention has a volume resistivity (electric insulation) that is measured by the method described in the Example of $1.0 \times 10^{12}$ Ω·cm or more.

The composition according to the present invention can be molded and cured into a rubber member for electric power cable connecting portions, i.e. the rubber stress cone through various molding methods such as die casting or extrusion molding.

The thus obtained rubber cured product, rubber stress-cone, can be used as a member for an electric power cable or for telecommunications, and is suitable for the rubber member for electric power cable connecting portions.

In a middle connection portion and a terminal connection portion of the electric power cable, the rubber member for electric power cable connecting portions is used, for example, as an electric field-relaxing layer for a connecting jig.

Furthermore, the use of the molded article as a capacitor material makes it possible to realize downsizing and high functionalization of electronic parts as the high-dielectric material.

Moreover, the composition in which the mixture containing the polyorganosiloxane and the curing agent, or the epoxy resin is used as the component (A) is desirable as a composition for producing electric power member or telecommunication device member.

EXAMPLE

In the Example and Comparative Example, "part" represents "part by mass".

The measurement methods of the measurement items in Table 1 and Table 2 are as follows:

<Electric Properties>

Relative Dielectric Constant and Dielectric Tangent

As to the samples for measuring the relative dielectric constant obtained in the Examples and Comparative Examples, relative dielectric constants were measured through the use of Material Analyzer 4291B and attached Test Station manufactured by Agilent Technologies Inc., and a high impedance head, Dielectric Test Fixture 16453A manufactured by Agilent Technologies Inc.

The measurement method was performed in accordance with the RF voltage and current measurement method (RF-IV method). At the time of measurement, the frequency was 1 MHz, and the applied voltage was 0.5 V/1 mm.

Volume Resistivity

In accordance with JIS K 6249, a digital super-high resistance/microammter of R8340 manufactured by Advantest Corporation was used.

Meanwhile, the expression of the volume resistivity in Table 1 and Table 2, for example, "3E15" means "$3\times10^{15}$".

<Physical Properties>

The hardness was measured in accordance with JIS K 6249.

The elongation was measured in accordance with JIS K 6249.

The tensile strength was measured in accordance with JIS K 6249.

Example 1

A composition was obtained by kneading, for 30 minutes, the component (A) of 100 parts of an epoxy resin (Trade name Epikoat 815 manufactured by Japan Epoxy Resin Co., Ltd.) and 8 parts of 1-isobutyl-2-methylimidazole as a curing agent, 600 parts of (B) a perovskite-type composite oxide powder having an average particle size of 21 μm, a specific surface area of 0.61 m²/g, a molar ratio of A/B of 1.000, and a molar ratio of Ba/Ti of 1.153.

The obtained composition was casted into a die of 130 mm square, 1 mm thickness, and molding was carried out under heating and pressurization. The molding was carried out for 30 minutes at 120° C., and a molding pressure was 10 MPa.

Examples 2 to 4, Comparative Examples 1 to 2

The compositions and cured articles were manufactured in the same manner as in Example 1 except that the materials of the kinds and amounts shown in Table 1 were used.

Example 5

A composition was obtained by kneading, for 30 minutes, the component (A) of 100 parts of an epoxy resin (Trade name Epikoat 815 manufactured by Japan Epoxy Resin Co., Ltd.) and 8 parts of 1-isobutyl-2-methylimidazole as a curing agent, 600 parts of (B) a perovskite-type composite oxide powder having an average particle size of 21 μm, a specific surface area of 0.61 m²/g, a molar ratio of A/B of 1.000, and a molar ratio of Ba/Ti of 1.153, and 27 parts of a carbon black (ASAHI#50 manufactured by ASAHI CARBON CO., LTD.) of the component (C).

The obtained composition was casted into a die of 130 mm square, 1 mm thickness, molding was carried out under heating and pressurization. The molding was carried out for 10 minutes at 120° C., and a molding pressure was 10 MPa.

Example 6

The component (A) was obtained from 99 parts of polyorganosiloxane which is terminated at both ends with trimethylsilyl groups, which includes 99.5% by mole of methylsiloxy unit and 0.5% by mole of methylvinylsiloxy unit, and which has a degree of polymerization of 5000, and 1 part of silanol group-containing dimethylpolysiloxane (degree of polymerization n=25) as a dispersing agent.

315 parts of the perovskite-type composite oxide powder of the component (B) (average particle size of 21 μm, specific surface area of 0.61 m²/g, molar ratio of A/B of 1.000, and molar ratio of Ba/Ti of 1.153), the component (A), and 15 parts of a silica (Aerosil 200 manufactured by Japan Aerosil Co., LTD.) as a reinforcing silica were kneaded through the use of a kneader for 2 hours at a temperature of 150° C.

With the obtained kneaded material, 2 parts of 2,5-dimethyl-2,5-di-t-butyl peroxyhexane as a curing agent was mixed through the use of two rolls, and a composition was obtained.

By using the obtained composition, elastic sheets of 130 mm square, 2 mm thickness and 1 mm thickness were molded under heating and pressurization. The molding was carried out for 10 minutes at 170° C., and the molding pressure was 10 MPa.

After that, a secondary crosslinking (post curing) was performed for 4 hours at 200° C., and the respective samples for physical properties and for measuring relative dielectric constant were produced.

Example 7

The component (A) was obtained from 99 parts of polyorganosiloxane which was terminated at both ends with trimethylsilyl groups, which includes 99.5% by mole of methylsiloxy unit and 0.5% by mole of methylvinylsiloxy unit, and which has a degree of polymerization of 5000, and 1 part of silanol group-containing dimethylpolysiloxane (degree of polymerization n=25) as a dispersing agent.

The aforementioned component (A), 315 parts of the perovskite-type composite oxide powder of the component (B) (average particle size of 21 μm, specific surface area of 0.61 m²/g, molar ratio of A/B of 1.000, and molar ratio of Ba/Ti of 1.153), 27 parts of a carbon black of the component (C) (ASAHI#50 manufactured by ASAHI CARBON CO., LTD.), and 15 parts of a silica (Aerosil 200 manufactured by Japan Aerosil Co., LTD.) as a reinforcing silica were kneaded

TABLE 1

|  |  | Examples | | | | | Comparative Examples | |
|---|---|---|---|---|---|---|---|---|
|  |  | 1 | 2 | 3 | 4 | 5 | 1 | 2 |
| (A) | Epoxy resin (parts by mass)*[1] | 100 | 100 | 100 | 100 | 100 | 100 | 100 |
| (B) | A/B molar ratio | 1.000 | 1.002 | 1.003 | 0.997 | 1.000 | 1.000 | 1.009 |
|  | Ba/Ti molar ratio | 1.153 | 1.155 | 1.16 | 1.145 | 1.153 | 1.000 | 1.163 |
|  | Average particle size (μm) | 21 | 21 | 22 | 20 | 20 | 2 | 21 |
|  | Proportion of average particle size range of 5-50 μm | 100 | 100 | 100 | 100 | 100 | 6 | 100 |
|  | BET specific surface area (m²/g) | 0.61 | 0.61 | 0.55 | 0.58 | 0.61 | 1.00 | 0.61 |
|  | Amount (parts by mass) | 600 | 600 | 600 | 600 | 600 | 600 | 600 |
| (C) | Carbon black (parts by mass) | 0 | 0 | 0 | 0 | 27 | 0 | 0 |
| Measurement item | Relative dielectric constant | 67 | 63 | 60 | 59 | 143 | 19 | 43 |
|  | Dielectric tangent | 0.011 | 0.013 | 0.016 | 0.017 | 0.057 | 0.008 | 0.014 |
|  | Volume resistivity (Ω·cm) | 4E+14 | 3E+14 | 4E+13 | 5E+13 | 1E+13 | 2E+15 | 3E+13 |

*[1]Although the component (A) also contains 8 parts by mass of a curing accelerator, only an amount of epoxy resin is described.

through the use of a kneader for 2 hours at a temperature of 150° C., and a kneaded material was obtained.

With the obtained kneaded material, 2 parts of 2,5-dimethyl-2,5-di-t-butyl peroxyhexane as a curing agent was mixed through the use of two rolls, and a composition was obtained.

By using the obtained composition, elastic sheets of 130 mm square, 2 mm thickness and 1 mm thickness were molded under heating and pressurization. The molding was carried out for 10 minutes at 170° C., and a molding pressure was 10 MPa.

After that, a secondary crosslinking (post curing) was performed for 4 hours at 200° C., and the respective samples for physical properties and for measuring relative dielectric constant were produced.

Examples 8 to 11, Comparative Examples 3 to 5

The respective samples for physical properties and for measuring relative dielectric constant were produced, in the same manner as in Example 6 or 7 except that materials of the kinds and amounts shown in Table 2 were used.

Meanwhile, in Example 11, as the component (B), there was used a mixture of 60% by mass of one having an average particle size of 20 μm and 40% by mass of one having an average particle size of 2 μm. In addition, Comparative Example 3 is an example in which only the carbon material was blended into the silicone compound and the perovskite-type composite oxide was not used.

Example 12

The respective samples for physical properties and for measuring relative dielectric constant were produced, in the same manner as in Example 7 except that there was used, as the component (A), 4 parts of a fluorosilicone oil (methyltrifluoropropylsiloxy unit 100%, terminal group being silanol. viscosity 0.13 Pa·s) as a dispersing agent, relative to 100 parts of fluorosilicone crude rubber (methyltrifluoropropylsiloxy unit 99.8%, methylvinyl unit 0.2%, terminal group being trimethylsilyl, viscosity being crude rubber-like and 8,000 Pa·s).

Example 13

As the component (A), 100 parts of dimethylpolysiloxane which is terminated at both molecular ends with vinyldimethylsiloxy groups and which has a viscosity of 10 Pa·s, 27 parts of an aerosil silica (Aerosil 130 manufactured by Japan Aerosil Co., LTD.), and 4 parts of hexamethylsilazane were kneaded uniformly through the use of a universal kneader, and were then subjected to decompression processing for 2 hours at a temperature of 150° C.

Thereto, there were added and stirred 328 parts of the high dielectric filler shown in Table 2 as the component (B), 4 parts of dimethylsiloxane-methylhydrogensiloxane copolymer which includes 50% by mole of $(CH_3)HSiO$ unit and 50% by mole of $(CH_3)_2SiO$ unit, and which is terminated at both molecular ends with trimethylsiloxy groups.

Finally, 0.1 part of a platinum-octanol complex solution (platinum content 4.0%) as a platinum catalyst, and 0.01 part by weight of 1-ethynyl-1-cyclohexanol as a curing inhibitor were added and mixed.

The mixed composition was casted to a die of 2 mm thickness, was press-cured for 10 minutes at a temperature of 170° C. (primary vulcanization), and a rubber sheet of 2 mm thickness was obtained. After that, a secondary vulcanization was carried out for 4 hours under the condition at 200° C. in an oven.

Various evaluations of these samples were performed.

Evaluation methods are as follows. The results are shown in Table 2.

TABLE 2

| | | Examples | | | | | | | | Comparative Examples | | |
|---|---|---|---|---|---|---|---|---|---|---|---|---|
| | | 6 | 7 | 8 | 9 | 10 | 11 | 12 | 13 | 3 | 4 | 5 |
| (A) | Base polymer (parts by mass) | 100 | 100 | 100 | 100 | 100 | 100 | 104 | 100 | 100 | 100 | 100 |
| (B) | A/B molar ratio | 1.000 | 1.000 | 1.002 | 1.003 | 0.997 | 1.001 | 1.003 | 1.003 | — | 1.000 | 1.009 |
| | Ba/Ti molar ratio | 1.153 | 1.153 | 1.155 | 1.160 | 1.145 | 1.150 | 1.160 | 1.160 | — | 1.000 | 1.163 |
| | Average particle size (μm) | 21 | 21 | 22 | 20 | 20 | 3 | 20 | 20 | — | 2 | 21 |
| | Proportion of average particle size range of 5-50 μm (% by mass) | 100 | 100 | 100 | 100 | 100 | 60 | 100 | 100 | — | 6 | 100 |
| | BET specific surface area ($m^2/g$) | 0.61 | 0.61 | 0.61 | 0.55 | 0.58 | 0.81 | 0.55 | 0.55 | — | 1.00 | 1.00 |
| | Amount (parts by mass) | 315 | 315 | 315 | 315 | 315 | 315 | 285 | 315 | 0 | 315 | 315 |
| (C) | Carbon black (parts by mass) | 0 | 27 | 27 | 27 | 27 | 27 | 27 | 0 | 27 | 0 | 27 |
| Curing agent, Reinforcing silica | Reinforcing silica (aerosil 200) | 15 | 15 | 15 | 15 | 15 | 15 | 15 | | 15 | 15 | 15 |
| | Reinforcing silica (aerosil 130) | | | | | | | | 27 | | | |
| | Hexamethylsilazane | | | | | | | | 4 | | | |
| | 2,5-Dimethyl-2,5-di-t-butylperoxyhexane | 2 | 2 | 2 | 2 | 2 | 2 | 2 | | 2 | 2 | 2 |
| | Dimethylsiloxane-methylhydrogensiloxane copolymer | | | | | | | | 4 | | | |
| | Platinum catalyst | | | | | | | | 0.1 | | | |
| | 1-Ethynyl-1-cyclohexanol | | | | | | | | 0.01 | | | |

TABLE 2-continued

|  |  | Examples | | | | | | | | Comparative Examples | | |
| --- | --- | --- | --- | --- | --- | --- | --- | --- | --- | --- | --- | --- |
|  |  | 6 | 7 | 8 | 9 | 10 | 11 | 12 | 13 | 3 | 4 | 5 |
| Measurement item | Hardness | 48 | 81 | 76 | 77 | 73 | 65 | 83 | 55 | 33 | 44 | 75 |
|  | Elongation | 390 | 150 | 260 | 170 | 160 | 250 | 80 | 250 | 530 | 360 | 210 |
|  | Tensile strength | 1.3 | 3.0 | 2.7 | 3.0 | 2.4 | 3.1 | 2.4 | 1.8 | 5.6 | 2.2 | 2.7 |
|  | Relative dielectric constant | 21 | 46 | 38 | 37 | 37 | 40 | 82 | 22 | 15 | 10 | 32 |
|  | Dielectric tangent | 0.003 | 0.040 | 0.048 | 0.030 | 0.050 | 0.034 | 0.054 | 0.003 | 0.077 | 0.002 | 0.041 |
|  | Volume resistivity (Ω · cm) | 3E+14 | 3E+13 | 1E+13 | 7E+13 | 5E+13 | 5E+13 | 3E+12 | 3E+14 | 1E+12 | 2E+15 | 1E+13 |

The invention claimed is:

1. A high dielectric insulating resin composition, comprising:
component (A): 100 parts by mass of a thermosetting resin serving as a dispersing medium of a component (B), and component (B): 100 to 3000 parts by mass of a perovskite-type composite oxide powder which includes secondary particles obtained by primary particles bonded to each other by sintering, and which is represented by the formula: $ABO_3$, wherein A is selected from Ba, Ca, and Sr and contains at least Ba, B is selected from Ti and Zr and contains at least Ti, a molar ratio of A/B is 0.996 to 1.005, and a molar ratio of Ba/Ti is 1.010 to 1.400.

2. The high dielectric insulating resin composition according to claim 1, wherein the component (B) is a sintering-treated perovskite-type composite oxide powder having an average particle size of 5 to 50 μm, and a BET specific surface area of 0.05 to 5.00 m²/g.

3. The high dielectric insulating resin composition according to claim 1, further comprising a carbon black as a component (C) in an amount of 0.1 to 40 parts by mass relative to 100 parts by mass of a synthetic resin which is the component (A).

4. The high dielectric insulating resin composition according to claim 1, wherein the thermosetting resin of the component (A) is epoxy resin.

5. A member for electric power or telecommunication comprising a molded article obtained from the high dielectric insulating resin composition according to claim 1, by using a mixture containing an epoxy resin, as the component (A).

6. A high dielectric insulating resin composition, comprising:
component (A): 100 parts by mass of a thermosetting resin serving as a dispersing medium of a component (B), and component (B): 100 to 3000 parts by mass of a perovskite-type composite oxide powder which includes secondary particles obtained by primary particles bonded to each other by sintering, and which is represented by the formula: $ABO_3$, wherein the perovskite-type composite oxide powder of component (B) is a mixture of particles having an average particle size of 5 to 50 μm and particles having an average particle size of not less than 0.1 to less than 5 μm, a content ratio of the particles having an average particle size of 5 to 50 μm is from 50% by mass to 90% by mass, and a content ratio of the particles having an average particle size of not less than 0.1 to less than 5 μm is from 10% by mass to 50% by mass which is the residual part of the above.

7. A high dielectric insulating resin composition, comprising:
component (A): 100 parts by mass of a polymeric material serving as a dispersing medium of a component (B), and component (B): 100 to 3000 parts by mass of a perovskite-type composite oxide powder which includes secondary particles obtained by primary particles bonded to each other by sintering, and which is represented by the formula: $ABO_3$, wherein A is selected from Ba, Ca, and Sr and contains at least Ba, B is selected from Ti and Zr and contains at least Ti, a molar ratio of A/B is 0.996 to 1.005, a molar ratio of Ba/Ti is 1.010 to 1.400, the polymeric material of the component (A) is a mixture containing a polyorganosiloxane and a curing agent, and the polyorganosiloxane is a perfluoroalkyl group-containing organosiloxane represented by the average composition formula (I):

$$R_a SiO_{(4-a)/2} \quad (I)$$

wherein 5 to 50% by mole of R is a group represented by the formula —$CH_2CH_2Rf$ in which Rf represents a perfluoroalkyl group having 1 to 3 carbon atoms, and the residual 95 to 50% by mole represents a saturated or unsaturated monovalent hydrocarbon, and a is a numeral of 1.8 to 2.3, and has a viscosity of 1 Pa·s or more at 23° C.

8. The high dielectric insulating resin composition according to claim 6, wherein the thermosetting resin of the component (A) is an epoxy resin.

9. A high dielectric insulating resin composition, comprising:
component (A): 100 parts by mass of a polymeric material serving as a dispersing medium of a component (B), and component (B): 100 to 3000 parts by mass of a perovskite-type composite oxide powder which includes secondary particles obtained by primary particles bonded to each other by sintering, and which is represented by the formula: $ABO_3$, where A is selected from Ba, Ca and Sr and contains at least Ba, B is selected from Ti and Zr and contains at least Ti, a molar ratio of A/B is 0.996 to 1.005, and a molar ratio of Ba/Ti is 1.010 to 1.400, the polymeric material of the component (A) is a mixture containing a polyorganosiloxane and a curing agent.

10. The high dielectric insulating resin composition according to claim 9, wherein the polyorganosiloxane is represented by the average composition formula (I):

$$R_a SiO_{(4-a)/2} \quad (I)$$

wherein R is a substituted or unsubstituted monovalent hydrocarbon group and a is a numeral of 1.98 to 2.02.

11. The high dielectric insulating resin composition according to claim 10, wherein the polyorganosiloxane is a fluoroalkyl group-containing organosiloxane.

12. The high dielectric insulating resin composition according to claim 11, wherein the fluoroalkyl group-containing organosiloxane contains a 3,3,3-trifluoropropyl group.

13. The high dielectric insulating resin composition according to claim 9, wherein component (A) consists of 99 parts of a polyorganosiloxane which is terminated at both ends with trimethylsilyl groups, contains 99.5 mole % of methylsiloxy units and 0.5 mole % of methylvinylsiloxy units and 1 part of a silanol group-containing dimethylpolysiloxane.

14. The high dielectric insulating resin composition according to claim 9, wherein component (A) consists of a dimethylpolysiloxane which is terminated at both ends with vinyldimethylsiloxy groups.

15. The high dielectric insulating resin composition according to claim 10, wherein the polyorganosiloxane is terminated at both ends with at least one of a trimethylsilyl group and a dimethylvinylsilyl group and contains a vinyl group in an amount of 0.05-3.0% relative to the total amount of the monovalent hydrocarbon group.

* * * * *